MAGNETIC TOGGLE

Filed Sept. 8, 1959 2 Sheets-Sheet 1

| CLOCK PULSE TIME | 1 | 2 |
|---|---|---|
| A | 0 | 0 |
| B | − | + |
| C | + | − |

INVENTOR.
EDWIN S. LEE, III
BY Christie, Parker & Hale
ATTORNEYS

| CLOCK PULSE TIME | 1 | 2 | 3 |
|---|---|---|---|
| A | 0 | 0 | 0 |
| B | + | − | 0 |
| C | 0 | + | − |

INVENTOR.
EDWIN S. LEE, III
BY
Christie, Parker & Hale
ATTORNEYS

United States Patent Office 3,044,044

Patented July 10, 1962

3,044,044
MAGNETIC TOGGLE

Edwin S. Lee III, San Gabriel, Calif., assignor to Burroughs Corporation, Detroit, Mich., a corporation of Michigan Filed Sept. 8, 1959, Ser. No. 838,463
7 Claims. (Cl. 340—174)

Figure 1:
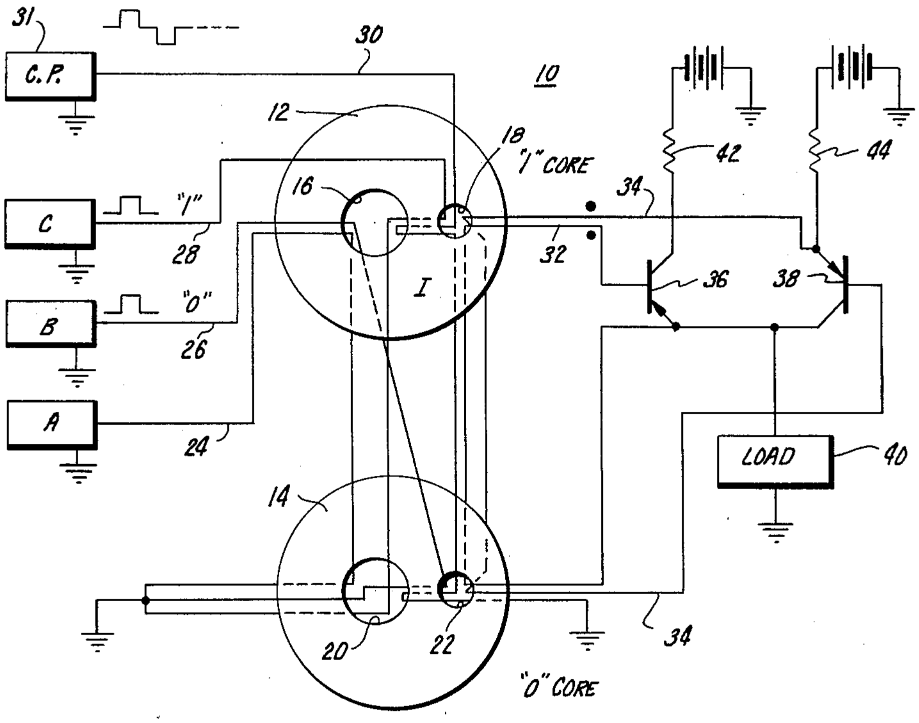

This invention relates to magnetic circuits and more particularly to toggle or bi-stable circuits utilizing multi-path magnetic elements capable of use as controlling and computing elements and the like.

In the operation of computing and control circuits it is often necessary to provide bi-directional pairs of signals representative of a single computer or control signal coded in terms of a binary character. These bi-directional signals are advantageously utilized in controlling storage circuits such as in coincident current magnetic memory systems.

A magnetic element that may be advantageously employed in the circuits of this invention is described in the Proceedings of the Institute of Radio Engineers in an article by J. A. Rajchman and A. W. Lo, entitled "The Transfluxor," for March 1956 appearing on pages 321–332.

This invention provides an improved and simplified magnetic device for toggle or bi-stable operation and which improved device is capable of providing pairs of bi-directional signals in response to binary coded information signals of the same polarity. The magnetic device comprises a pair of magnetic elements arranged to receive information signals, which may be the binary character one or zero, and to store this information while erasing the previously received information. The signals are received on separate input windings, in accordance with their binary character, and are coupled to each of the magnetic elements in a fashion to cause one of the elements to assume a blocked magnetic state and the other to assume an unblocked magnetic state. An output winding is coupled to each of the magnetic elements and is oriented thereon in opposite magnetic senses to read out the stored information from the unblocked element. The drive winding associated with a drive or clock source is capable of providing bi-directional signals to the cores in a timed relationship with the delivery of the signals to the magnetic elements. The pattern of bi-directional signals derived from the magnetic elements in response to the energization of the drive winding are dependent upon the information previously delivered to these cores. The output winding may be arranged with a switching circuit responsive to the bi-directional signals to act as a bi-directional current source.

In another embodiment of the invention a delayed set of bi-directional signals may be derived from the basic circuit configuration. In this particular embodiment three separate drive windings are provided. The three drive windings include a drive winding arranged to be unique to each magnetic element along with one drive winding common to both elements. The drive signal sources are arranged to energize the drive windings in a predetermined time relationship relative to one another and to the delivery of the information signals to the magnetic elements.

Figure 2:
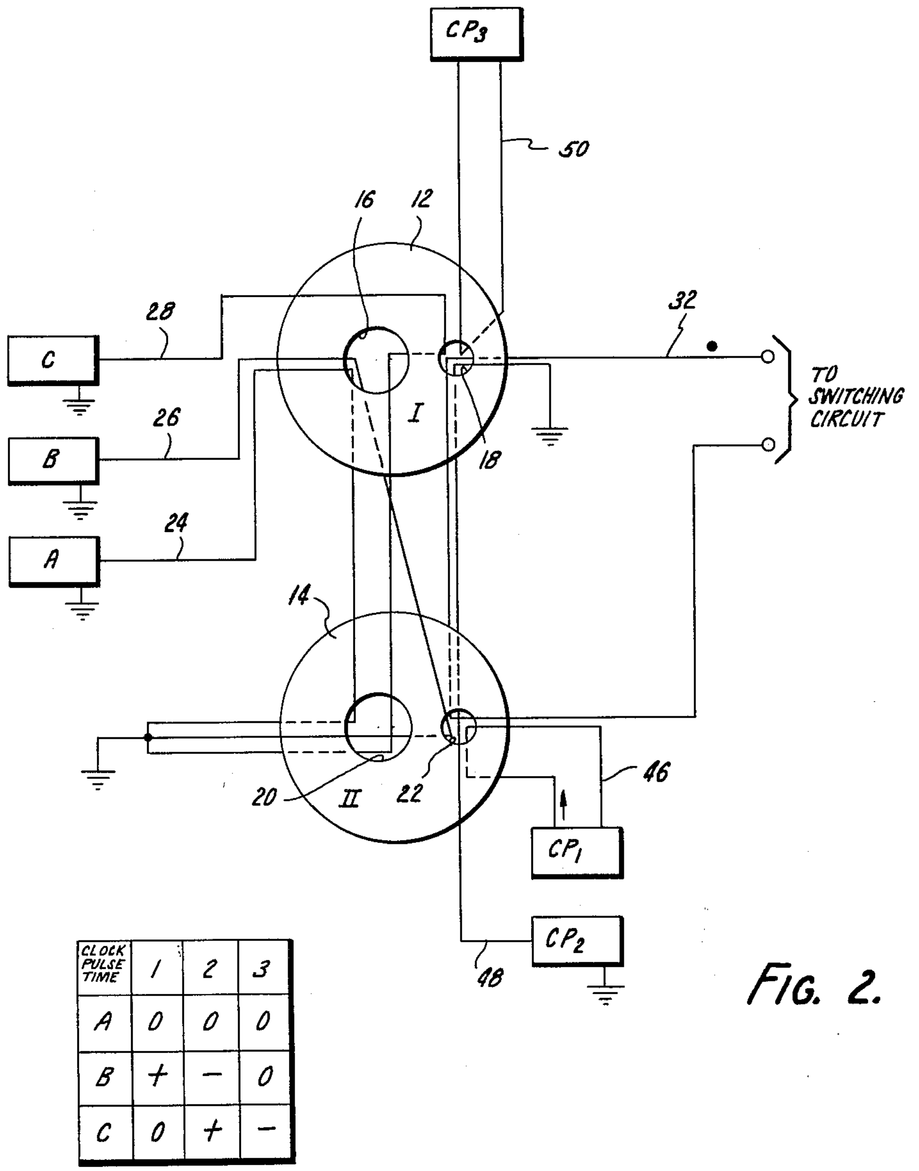

These and other features of the present invention may be more fully appreciated when considered in the light of the following specification and drawings, in which:

FIG. 1 is a block-circuit diagram of the magnetic device embodying the invention; and FIG. 2 is another embodiment of the invention of FIG. 1.

Now referring to the drawings, the invention will be described in more detail. The magnetic device 10 comprises a pair of similar magnetic cores 12 and 14 having substantially square or rectangular hysteresis characteristics. Each of the magnetic cores 12 and 14 have at least a pair of apertures of substantially different diameter whereby the multiple flux paths defined within the magnetic cores 12 and 14 encircle the apertures and accordingly are of substantially different lengths. The larger aperture 16 for the magnetic core 12 may be approximately twice the diameter of the small aperture 18 for this core. In the same fashion the large aperture for the core 14 is identified by reference character 20, while the smaller aperture is denoted by the reference character 22.

The multiple flux paths may be better examined in terms of magnetic legs defined within the cores 12 and 14. Considering the magnetic core 12, for example, a first magnetic leg may be considered to be defined by the area extending inwardly of the outer peripheral edge, or the left hand edge of the core 16 as shown in FIG. 1, to the adjacent peripheral edge of the aperture 16. A second magnetic leg is defined by the area intermediate the apertures 16 and 18, while the third leg is defined by the magnetic material extending from the right hand edge of the aperture 18 to the adjacent peripheral edge of the magnetic core 12. The magnetic paths may be considered to include a flux path encircling the aperture 16 with a second substantially longer flux path encircling both the apertures 16 and 18. When these two flux paths are in the same direction the magnetic core will be considered to be blocked, that is, no output information may be derived from the core upon sensing the core when it is in this magnetic state. For the purposes of this invention the blocked condition of the core is considered to be when both of the flux paths are in a clockwise direction about the aperture 16. An unblocked magnetic state results when the direction of the flux path around the larger aperture 16 is in a counter clockwise sense and the longer flux path is in the clockwise sense. It is during this latter interval, when the flux around the small aperture 18 is in opposite directions that the information stored in the magnetic core may be sensed and a signal derived in accordance with the stored information. A more detailed description of the basic operation of the magnetic elements may be had by reference to the above-identified article of Rajchman and Lo.

The magnetic elements 12 and 14 are arranged to receive information coded in terms of binary characters by means of separate input windings coupled to both of the cores. An input winding arranged to cause both of the magnetic elements 12 and 14 to assume a blocked condition is identified by the reference character 24. The input winding 24 is coupled to the magnetic core 12 through the larger aperture 16 to control the direction of the flux in the first magnetic leg and the same winding is coupled in the same fashion and sense to the first leg of the magnetic core 14 by means of the aperture 20 therefor. The input winding 24 may be coupled to a source of signals represented by a block identified as A. It will be appreciated that the signals derived from source A will be of the correct polarity and intensity to cause both cores 12 and 14 to assume the blocked magnetic state. A second input winding 26 is coupled to the first magnetic core 12 by means of the aperture 16 to control the direction of flux in the first leg thereof and is also coupled to the magnetic core 14 to control the flux in leg 2 of this latter mentioned core. The control of leg 2 of the magnetic core 14 is effected by passing the input winding 26 through the small aperture 22 and through the large aperture 20 of the core 14. A third input winding 28 is arranged to control the direction of flux in leg 2 of the magnetic core 12 and the direction of flux in leg 1 for the magnetic core 14. The input winding 28 is accordingly coupled through the apertures 18 and 16 for the magnetic core 12 and then passed through the aperture 20 for the magnetic core 14. Each of the input windings 26 and 28 are connected to information signal sources identified by the blocks B and C respectively. The information received on the input winding 26 may be considered a binary zero while the information received on the input winding 28 may be considered a binary one.

It should be noted that the orientation of the input winding 26 is arranged to block the magnetic core 12 while substantially simultaneously it unblocks the magnetic core 14. In this same fashion the input winding 28 is arranged to unblock the magnetic core 12 and block the magnetic core 14. In each of these instances the blocking of the cores is controlled by providing an input signal to control the direction of flux in leg 1 while the unblocking changes the direction of flux in leg 2. The delivery of information from either of the sources A, B, or C is in a timed relationship relative to one another and the delivery or writing into the magnetic cores 12 and 14 is effective to erase the previously delivered information.

A drive or clock pulse winding 30 is also coupled to the smaller apertures 18 and 22 for the magnetic cores 12 and 14 respectively. The drive winding 30 is coupled from a pulse source 31 illustrated in block form, and is coupled to leg 2 of each of the magnetic cores 12 and 14 through the pair of apertures in the same magnetic sense. The clock pulse source 31 has the characteristic of providing a pair of spaced bi-directional signals arranged in a timed relationship. The pulse pattern delivered by the clock pulse source 31 comprises alternate signals of different polarity. The signals may comprise a pattern of positive signals followed by their negative counterpart. The energization of the drive winding 30 in this fashion merely switches flux around the smaller apertures 18 and 22 when they are in an unblocked state and does not destroy the information stored therein.

An output winding 32 is coupled to the third magnetic legs for each of the cores 12 and 14 by means of the respective apertures 18 and 22. The output winding 32 is coupled to the magnetic cores 12 and 14 to be responsive to the signals generated by the energization of the drive winding 30. The winding 32 is coupled in opposite magnetic senses to cores 12 and 14 to provide the alternate pair of bi-directional signals therefrom. When the magnetic device 10 is utilized with a switching circuit acting as a current source for providing bi-directional signals a second output winding 34 arranged with the magnetic cores 12 and 14 in the same fashion as the output winding 32 is required.

The switching circuit shown in FIG. 1 comprises a pair of transistors 36 and 38 arranged to be responsive to the output windings 32 and 34 respectively. The transistor 36 is connected with the terminal portion of the output winding 32 from the magnetic core 12 and with its emitter electrode connected to the terminal portion of the winding 32 from the magnetic core 14. It will be appreciated that the signal derived from the output winding 32 will control the conduction of the transistor 36 and accordingly the direction of the current flow through the load, identified in block form by the reference character 40. The transistor 36 is non-conductive until a negative impulse is provided in winding 32. The triggering of the transistor 36 in this fashion may be considered to provide a negative current through the load 40 while a positive current is provided by the connection of the output winding 34 to the transistor 38. This latter connection comprises the connection of the base of the transistor 38 to the terminal portion of the winding 34 for the magnetic core 12 while the terminal portion of the winding 34 from the magnetic core 14 is coupled to the emitter circuit therefor. At this point it should be noted that the transistors 36 and 38 are arranged in complementary fashion to be responsive to output signals of different polarities. To this end the collector electrode for the transistor 36 is connected to a negative voltage source by means of a dropping resistor 42, while the emitter electrode for the transistor 38 is connected to a positive voltage source by means of a resistor 44. The emitter electrode for the transistor 36 is connected in common with the collector electrode for the transistor 38 to the load 40.

The time relationship of the signals delivered by the sources A, B, C and the block pulse source 31 is indicated by the chart accompanying FIG. 1. The information signals are delivered to the magnetic device 10 from one of the information sources A, B, or C and at a preselected time. Later these signals are read out by the energization of the drive winding 30 to provide the signal to the switching circuit for energizing the load 40. If a signal is delivered to the input winding 24, both the magnetic elements 12 and 14 are in the blocked state and when the drive winding 30 is energized by the clock pulse source 31 no output signal is derived at either of the output windings 32 or 34. Specifically, neither positive nor negative pulses from the source 31 will provide an output pulse to energize the load 40. This condition is indicated by the zero for clock pulse times 1 and 2 and which clock pulse times correspond to the positive-negative pattern of pulses opposite the line A in the timing chart.

Assuming a signal corresponding to binary zero is delivered from the source B, the input winding 26 will be energized so as to block the core 12 and to unblock the core 14. When the magnetic elements are arranged in this fashion, the clock pulse on the winding 30 will provide a negative output signal from the magnetic core 14 on windings 32 and 34 during clock pulse time 1 while a positive clock pulse will be provided from this same core at clock pulse time 2. It will be appreciated that the derivation of a positive or negative pulse from the cores 12 and 14 is relative and a dot notation has been indicated for the windings 32 and 34 to indicate the reference for each pair of leads. When the dot terminal is at a higher potential than its opposite terminal it is considered as positive and vice versa. The negative output pulse derived at time 1 will cause transistor 36 to conduct and pass a current from ground through the load 40 to the negative terminal of the voltage source by means of the transistor 36 for this interval. The negative pulse is also generated at the output winding 34 but which negative pulse has no effect on the non-conductive condition of transistor 38. During clock pulse time 2 the polarity of the output signal is now positive and will have no effect on the non-conductive transistor 36 but will cause the transistor 38 to conduct whereby a current is passed from the positive terminal of the voltage source, through the transistor 38, to the load 40 and to ground in a direction opposite from that provided by the transistor 36.

In the same fashion when an information signal or binary one is delivered from the source C the magnetic core 12 will be unblocked while the magnetic core 14 will be blocked. In this magnetic condition the output signal is derived from the magnetic core 12 whereby a sequence of positive and negative signals are derived in response to the energization of the drive winding 30 by the clock pulse source 31. This sequence results since the output windings 32 and 34 are coupled in opposite magnetic senses to the cores 12 and 14 as mentioned hereinabove. This pattern of output pulses will in turn provide a positive-negative sequence of current pulses through the load 40.

Now referring to FIG. 2 another embodiment of the invention will be described. The embodiment of FIG. 2 is substantially similar to that of FIG. 1 except that in this embodiment a delayed pair of bi-directional signals is provided. The input windings 24, 26 and 28 are arranged in the same fashion as in the previous embodiment. The output winding 32, only one shown for simplicity, is coupled in the same fashion but with the same magnetic sense for both magnetic cores 12 and 14. In this instance instead of a single drive winding, three separate drive windings 46, 48 and 50 are provided. The drive winding 46 is coupled through the aperture 22 of the magnetic core 14 to be responsive to the flux changes in leg 3 thereof. The drive winding 46 is further coupled to a clock pulse source identified in block form as $CP_1$. The drive winding 48 is coupled to both magnetic cores 12 and 14 by means of their respective apertures 18 and 22 and is responsive to the clock pulse source $CP_2$. The drive winding 48 is coupled to the core 14 in the opposite magnetic sense from winding 46. The drive winding 50 is coupled solely to the magnetic core 12 through the aperture 18 therefor and in the opposite magnetic sense from winding 48. The winding 50 is energized from the source $CP_3$.

It will be recognized from the above discussion and an examination of the timing chart accompanying FIG. 2 that the operation of this embodiment is essentially the same of that of FIG. 1. When the input winding 24 has been energized both magnetic cores 12 and 14 are blocked so that no output signals are derived at either clock pulse times 1, 2 or 3. When a signal energizes the input winding 26 from the source B, a pulse pattern is derived from the magnetic device 10 which includes a positive signal at clock time 1, followed by a negative signal at clock time 2 in turn followed by substantially no signal at clock time 3. This pattern results since the output signals are derived from magnetic core 14 and the windings 46 and 48 are coupled in the opposite magnetic sense to the core 14 while winding 50 is not coupled thereto. The remaining pulse pattern occurs when winding 28 is energized to provide a pulse pattern of zero, plus and minus as indicated in the chart.

It will now be appreciated that an improved and fast acting magnetic device providing bi-directional signals from single pulses has been provided.

What is claimed is:

1. A magnetic device comprising a plurality of magnetic storage elements each having a core characterized by a substantially square hysteresis loop, each of said cores having a relatively large input aperture and a relatively small output aperture spaced from said large aperture and arranged on said cores to define at least a pair of flux paths about each of said apertures of substantially different length to thereby define three distinct stable magnetic states, a first input winding coupled to one of said cores through said larger aperture and to the other core by means of both apertures, whereby the one of said cores is blocked and the other core is unblocked upon the energization of the first input winding, a second input winding magnetically coupled to the one core through both of said apertures and to the said other core through the larger of said apertures whereby the other of said cores is blocked and the one core is unblocked upon the energization of the second input winding, means for delivering binary coded information signals to the first and second input windings to be stored in one of the cores, a drive winding coupled to each of said cores through both of the apertures therefor to control the direction of the flux around the smaller aperture, a signal source capable of delivering bi-directional signals to said drive winding in a timed relationship with the delivery of said information signals, and an output winding means coupled to each of said cores through the smaller apertures to provide bi-directional output signals from one of said cores.

2. A magnetic device as defined in claim 1 wherein said output winding means includes a pair of output windings coupled to the cores in the same fashion and a switching circuit coupled to be responsive to the signals derived from each of said output windings for providing alternate sets of bi-directional current signals in accordance with the binary coded information delivered to the cores.

3. A magnetic device as defined in claim 1 including a third input winding coupled to the larger aperture for each of said cores to block the cores upon the energization of same and means for delivering signals to said third winding in a timed relationship with the delivery of the signals to the first and second input windings and the delivery of signals to said drive winding.

4. A magnetic device comprising a plurality of magnetic storage elements each having a core characterized by a substantially square hysteresis loop, each of said cores having a relatively large input aperture and a relatively small output aperture spaced from said large aperture and arranged on said cores to define at least a pair of flux paths about each of said apertures of substantially different length to thereby define a corresponding number of stable magnetic states, a first input winding coupled to one of said cores through said larger aperture to control the flux direction around the larger aperture and coupled to the other core by means of both apertures to control the direction of the flux passing between said apertures, means for coupling binary coded information signals of a preselected binary value to the first input winding, a second input winding magnetically coupled through both of said apertures for the said one core and to the said other core through the larger of said apertures to control the direction of the flux in a fashion corresponding to the first input winding, means for coupling binary coded information signals of the other binary value to said second input winding, a drive winding coupled to each of said cores through both of the apertures therefor to control the flux around the smaller aperture, a signal source capable of delivering sequentially occurring bi-directional signals to said drive winding, and an output winding means coupled to each of said cores through the smaller apertures whereby upon the energization of said drive winding bi-directional signals may be derived from said output winding having an alternate polar relationship directly dependent on whether the first or second input winding had been previously energized.

5. A bi-stable circuit comprising first and second magnetic switching elements of high remanence characteristics, each of said elements having a plurality of apertures therein for defining first, second, and third legs in each of said elements to establish a pair of controllable flux paths of substantially different length linking said legs defining at least three distinct stable magnetic states, a first input winding magnetically coupled to the first leg of the first magnetic element and to the second leg of the second magnetic element, means for coupling binary coded information signals of a preselected binary value to the first input winding, a second input winding magnetically coupled to the second leg of the first magnetic element and to the first leg of the second magnetic element, means for coupling binary coded information of the other binary value to said second input winding, a drive winding coupled to the second leg of each of the magnetic elements, a signal source capable of delivering sequentially occurring bi-directional signals to said drive winding a preselected time interval after the energization of said first or second input winding, and an output winding means coupled to the third leg of each of the magnetic elements for responding to said sequential drive winding signals to provide bi-directional output signals from one of said cores arranged in accordance with the binary signal received by said one core.

6. A bi-stable circuit comprising first and second magnetic switching elements of high remanence characteristic, each of said elements having a plurality of apertures therein for defining first, second, and third legs in each of said elements to establish a pair of controllable flux paths of substantially different length linking said legs, a first input winding magnetically coupled to the first leg of the first magnetic element and to the second leg of the second magnetic element, a second input winding magnetically coupled to the second leg of the first magnetic element and to the first leg of the second magnetic element, means for delivering information signals to said first and second input windings to be stored in one of the elements, output windings coupled to the third leg of each of the magnetic elements, a first drive winding coupled to the third leg of the second magnetic element, a second drive winding coupled to the third leg of each of the magnetic elements, a third drive winding coupled to the third leg of the first magnetic element, and a signal source capable of delivering bi-directional signals to said drive windings in a predetermined time relationship.

7. A bi-stable circuit comprising first and second magnetic switching elements of high remanence characteristic, each of said elements having a plurality of apertures therein for defining first, second, and third legs in each of said elements to establish a pair of controllable flux paths of substantially different length linking said legs, a first input winding magnetically coupled to the first leg of the first magnetic element and to the second leg of the second magnetic element, a second input winding magnetically coupled to the second leg of the first magnetic element and to the first leg of the second magnetic element, means for delivering information signals of a first binary value to said first input winding and of the other binary value to said second input winding to be stored in the corresponding one of the elements, output winding means coupled to the third leg of each of the magnetic elements, and drive winding means coupled to the third leg of each of the magnetic elements to alternately switch flux in the second and third legs of one of said switching elements to provide bi-directional output signals from said output winding in a time delayed relationship in accordance with the value of the binary coded signal received by said switching elements.

References Cited in the file of this patent

UNITED STATES PATENTS

| | | |
|---|---|---|
| 2,802,953 | Arsenault | Aug. 13, 1957 |
| 2,911,630 | Dinowitz | Nov. 3, 1959 |
| 2,966,664 | Lamy | Dec. 27, 1960 |